(12) United States Patent
Ishimaru et al.

(10) Patent No.: US 7,753,786 B2
(45) Date of Patent: Jul. 13, 2010

(54) HAND HELD CONTROLLER FOR GAMES

(75) Inventors: Hiroshi Ishimaru, Tokyo (JP); Tetsuya Kifune, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 1984 days.

(21) Appl. No.: 10/756,251

(22) Filed: Jan. 14, 2004

(65) Prior Publication Data
US 2004/0142749 A1    Jul. 22, 2004

(30) Foreign Application Priority Data
Jan. 14, 2003  (JP) ................. P.2003-006396

(51) Int. Cl.
*A63F 13/00* (2006.01)
(52) U.S. Cl. .................... 463/36; 463/37
(58) Field of Classification Search ............ 463/17, 463/37
See application file for complete search history.

(56) References Cited
U.S. PATENT DOCUMENTS
7,040,986 B2 *  5/2006  Koshima et al. ............. 463/37

FOREIGN PATENT DOCUMENTS
| JP | 2505253 | 5/1996 |
| JP | 2000-207130 | 7/2000 |
| JP | 2002-133970 | 5/2002 |
| JP | 2003-133652 | 5/2003 |

OTHER PUBLICATIONS

Japanese Office Action issued on Jun. 27, 2006 with English Translation.

* cited by examiner

*Primary Examiner*—John M Hotaling, II
(74) *Attorney, Agent, or Firm*—Whitham, Curtis, Christofferson & Cook, P.C.

(57) ABSTRACT

To reduce the number of parts in assembly of a trigger button in a controller for games, reduce the material cost, and heighten assembly efficiency.

In a controller for games in which trigger buttons are partially protruded outward from opening portions formed in a case, and the trigger buttons are energized by springs and provided slidably by guide of trigger guides, left and right fitting grooves extending up and down are provided on left and right sides of back end surfaces of the trigger guides; ribs for holding the lower end portions of the trigger guides are provided for the case; left and right standing portions are provided on the outsides of the ribs thereby to hold the lower ends of the trigger guides by the ribs; and the left and right standing portions are fitted into the left and right fitting grooves thereby to hold the trigger guides.

2 Claims, 10 Drawing Sheets

HAND HELD CONTROLLER FOR GAMES

BACKGAROUND OF THE INVENTION

1. Field of the Invention

The present invention relates to a controller for games, and particularly to a controller for games in which assembly of a trigger button is simplified.

2. Description of the Related Art

The applicant has already filed an application for this kind of controller for games (Japanese Patent Application Publication No. JP2003-133652). The controller for games of this application will be described with reference to FIG. 6. In the FIG. 6, reference numeral 1 represents a wiring board housed in a case of the controller for games. To the lower portion of the wiring board 1, a holder 2 is secured, a motor holder 3 is formed integrally with the holder 2, and an oscillating motor 4 is held by the motor holder 3. Further, near both sides of the oscillating motor 4, left and right slide switches 5, 6 operated by not-shown trigger buttons are arranged through slide switch holding portions 7, 8; and trigger button contact boards 9, 10 are provided through trigger button contact board holding portions 11, 12, spaced outward from the slide switches 5, 6.

Figure 6:
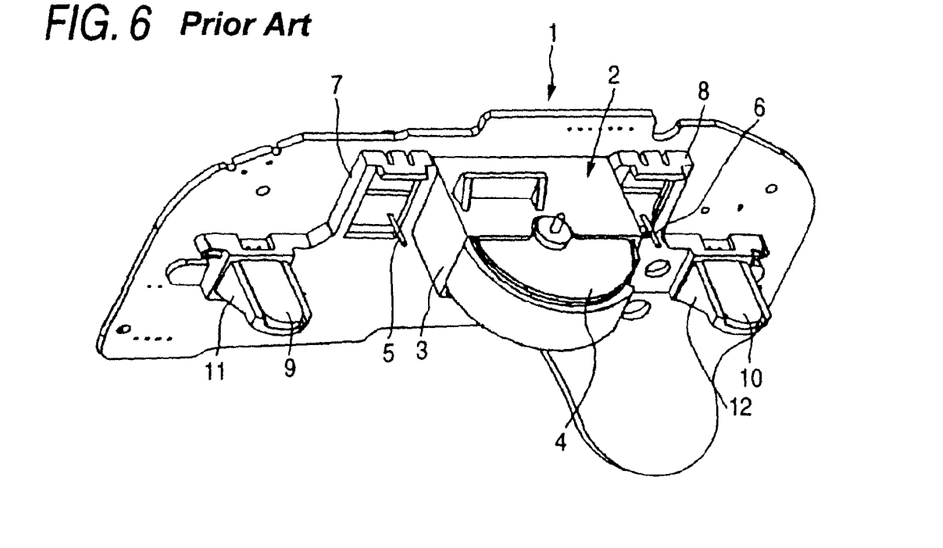
FIG. 6 is a perspective view showing a conventional example, which shows a state where a holder has been attached to a baseboard.

Namely, in the wiring board 1, the oscillating motor 4, slide switches 5, 6, and the trigger button contact boards 9, 10 are held integrally by the holder 2, whereby this controller for games has such advantage that the construction is simplified and assembly is facilitated.

Next, a controller for games carried out on the basis of this application will be described with reference to FIGS. 7 to 14.

Figure 7:
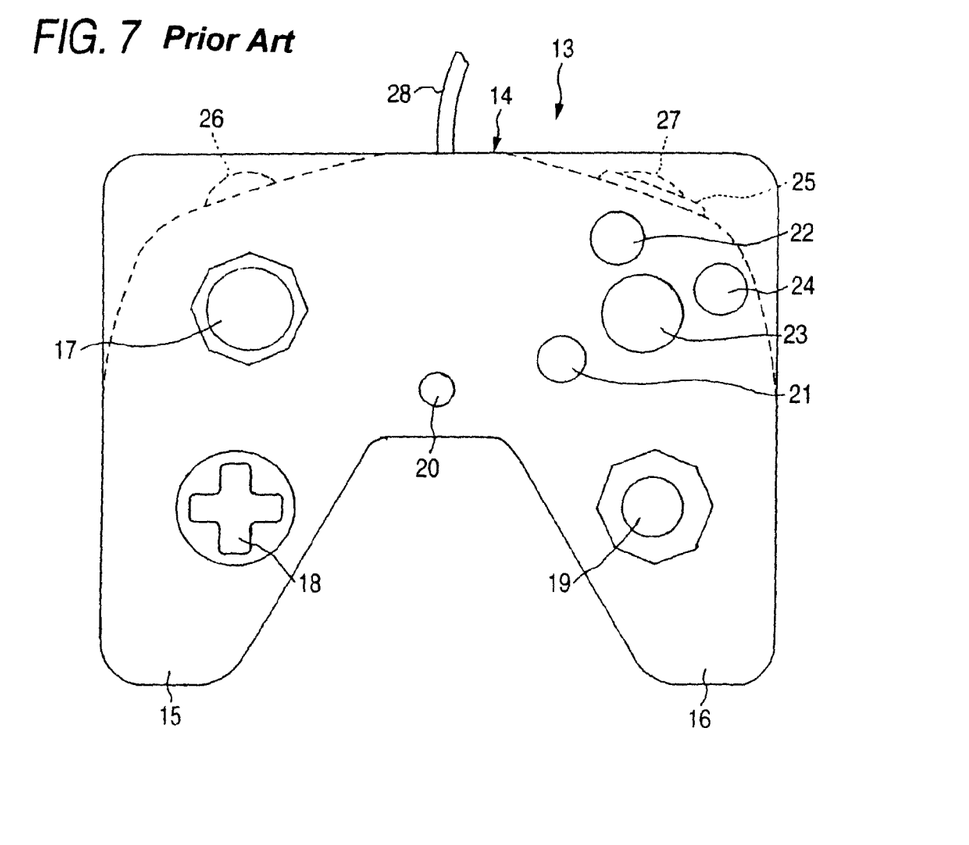
FIG. 7 is a plan view of a controller for games, showing another conventional example.

In FIG. 7, reference numeral 13 is a controller for games. The controller for games 13 includes grip portions 15, 16 at left and right back ends of a case 14; multi-directional switches 17, 18, 19 and single-directional switches 20, 21, 22, 23, 24 are provided on the upper surface of the case 14; and a single-directional switch 25, and left and right trigger buttons 26, 27 are arranged on a side surface of the case 14. In the figure, reference numeral 28 is a connection cable.

Figure 8:
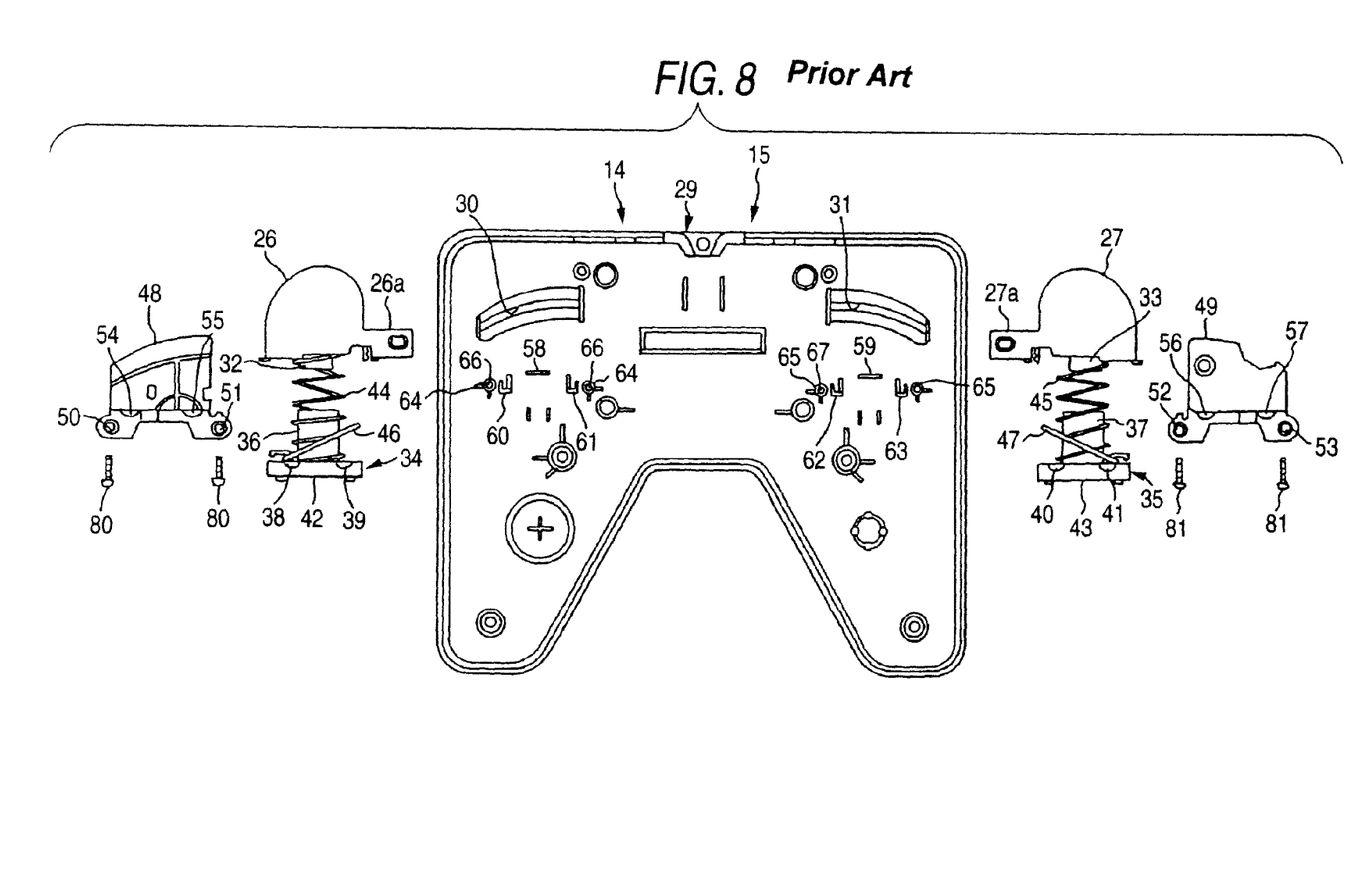
FIG. 8 is an exploded perspective view showing a state where a trigger button is to be attached to a lower case shown in FIG. 7.

In FIG. 8, reference numeral 29 is a lower case of the case 14, and opening portions 30, 31 are formed in both front end side portions of the lower case 29.

The trigger buttons 26, 27 are provided so that parts of them are protruded outward from the opening portions 30, 31. The front end of the trigger button 26, 27 is formed in the shape by which the trigger button is easily operated, and the back end of the trigger button 26, 27 includes protruded slide portion 32, 33 whereby the trigger button 26, 27 are slidable within openings 30, 31. Further, for the trigger buttons 26, 27, operational portions 26a, 27a which operate slide switches described later are respectively provided projectingly toward the inside.

Figure 9:
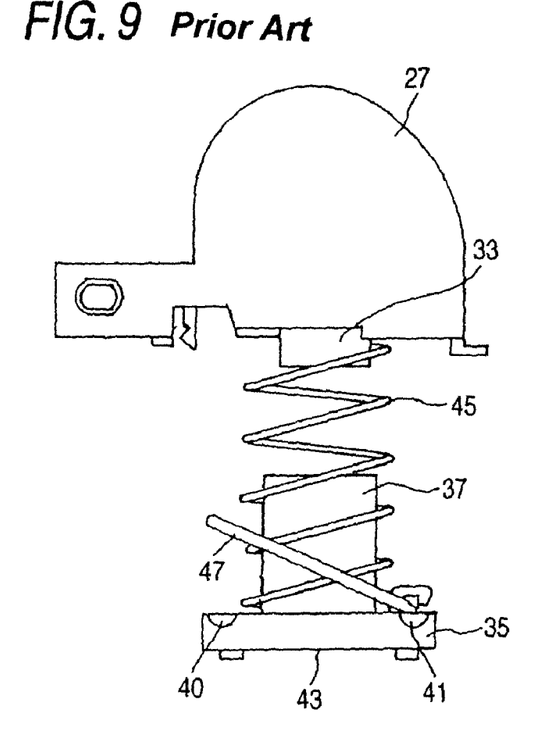
FIG. 9 is a plan view showing a state before assembly of the trigger button shown in FIG. 8 and a trigger guide.
Figure 10:
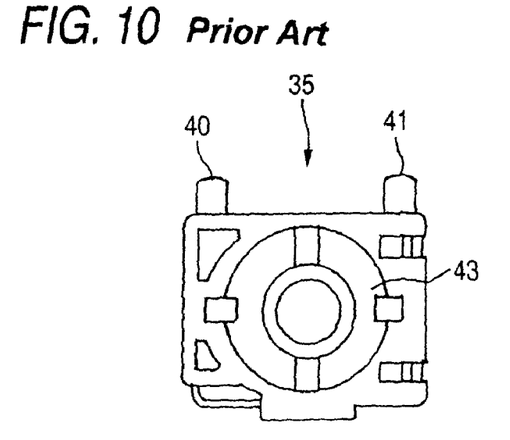
FIG. 10 is a front view of the trigger guide shown in FIG. 9.

On the other hand, on the backsides of the trigger buttons 26, 27, trigger guides 34, 35 are provided. At the front ends of the trigger guides 34, 35, cylindrical guide portions 36, 37 project into springs 44, 45, into which the slide portions 32, 33 of the trigger buttons 26, 27 are also inserted at the opposite ends thereof. On the upper end both sides of the trigger guides 34, 35, semi-cylindrical fitting portions 38, 39, 40, 41 shown in FIGS. 8 to 10 are provided. Further, in the central portions of the trigger guides 34, 35, through-holes (not shown) are formed, and at the rear ends of the trigger guides 34, 35, trigger rubbers 42, 43 which are pressed by the leading ends of the slide portions 32, 33 of the trigger buttons 26, 27 thereby to operate are provided. The trigger buttons 26, 27 and the trigger guides 34, 35 are respectively energized by springs 44, 45 in a direction where the trigger guide button and the trigger guide separate from each other.

Further, shafts 46, 47 bent in the rectangular shape, which attitude-control the slide of the trigger buttons 26, 27 fitted to and laid between the left back ends of the trigger buttons 26, 27 and the right front ends of the trigger buttons 26, 27 and the right front ends of the trigger guides 34, 35.

Figure 11:
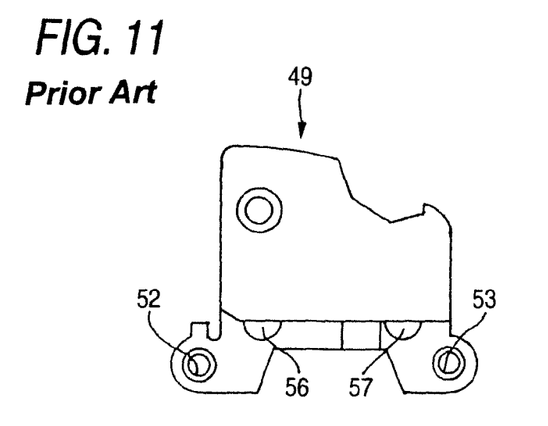
FIG. 11 is a plan view of a cover shown in FIG. 8.

Further, in FIGS. 8 and 11, reference numerals 48, 49 are covers, which cover the trigger buttons 26, 27 and the trigger guides 34, 35. In the back end both side ends of the covers 48, 49, bolt insertion holes 50, 51 and 52, 53 are formed, and through-holes 54, 55 and 56, 57 having semi-circular sections are formed somewhat inside the bolt insertion holes 50, 51 and 52, 53.

Figure 12:
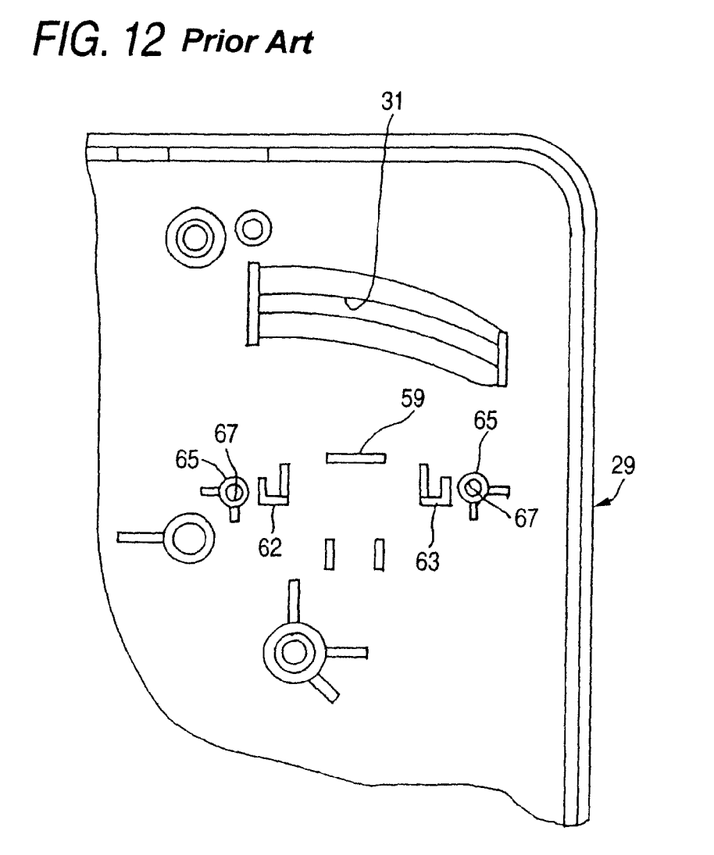
FIG. 12 is a partial plan view of the lower case shown in FIG. 8.

On the other hand, in FIGS. 8 and 12, in the back positions of the opening portions 30, 31 of the lower case 29, ribs 58, 59 for holding the front ends of the lower end portions of the trigger guides 34, 35, and ribs 60, 61, 62, 63 for holding the back ends and the left and right ends thereof are erectly provided. Further, somewhat outwardly of the ribs 60, 61, 62, 63, standing portions 64, 64 and 65, 65 for holding the covers 48, 49 are formed, and bolt holes 66, 66 and 67, 67 are formed at the upper ends of the standing portions 64, 64 and 65, 65.

Figure 13:
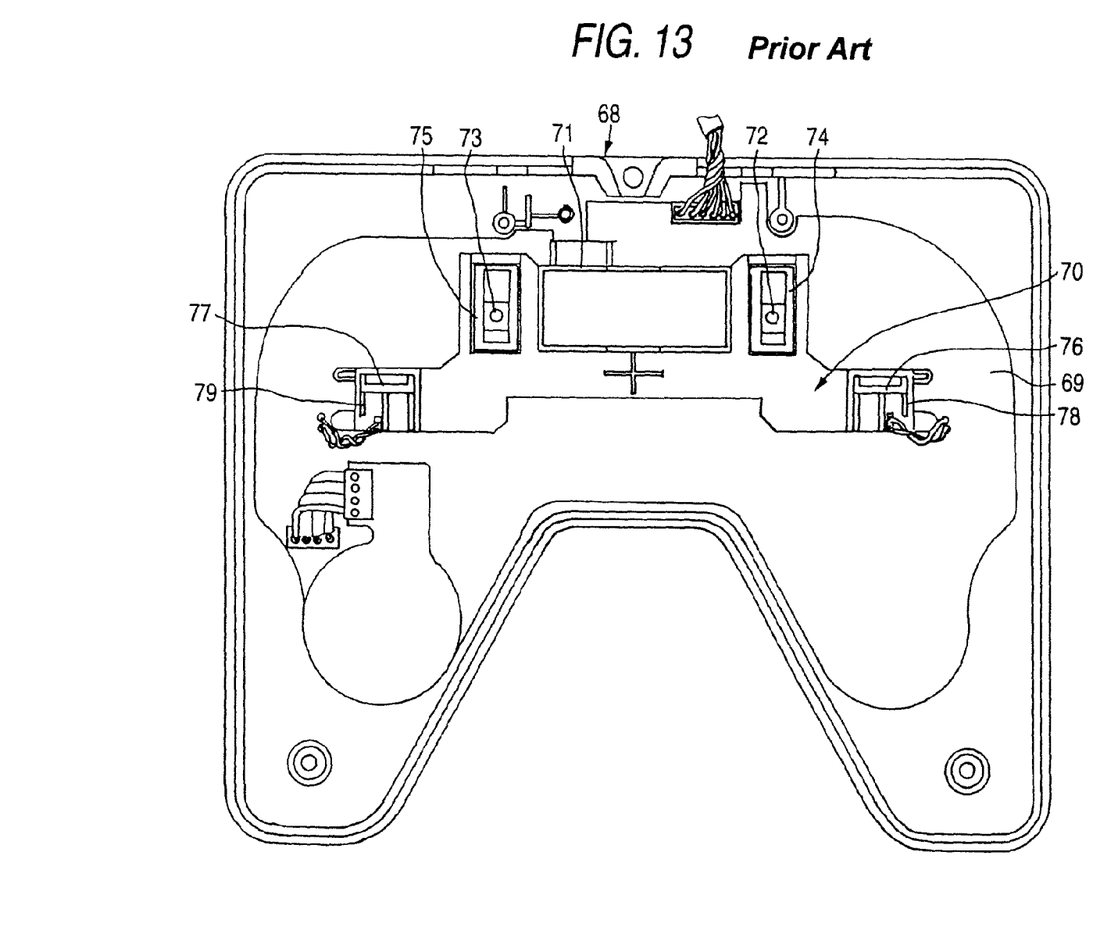
FIG. 13 is a perspective view of an upper case, a baseboard and a holder assembled into the upper case, showing another conventional example.

Further, in FIG. 13, reference numeral 68 is an upper case, in which a baseboard 69 is arranged. To the lower portion (the upper portion in FIG. 13) of the baseboard 69, a holder 70 is secured; a motor holder 71 is formed integrally with the holder 70; near both sides of the motor holder 71, left and right slide switches 72, 73 operated by the trigger buttons (reference numerals 26 and 27 in FIG. 9) are arranged through slide switch holding portions 74, 75; and trigger button contact baseboards 76, 77 are provided through trigger button contact baseboard holding portions 78, 79, spaced outward from the slide switches 72, 73.

When the trigger button 27 is assembled, the slide portion 33 of the trigger button 27 and the guide portion 37 of the trigger guide 35 are inserted into the spring 45, and the shaft 47 is fitted to the left back end of the trigger button 27 and to the right front end of the trigger guide 35. Further, after the slide portion 33 of the trigger button 27 has been inserted into the guide portion 37 of the trigger guide 35 under the movably inserted state, the front end of the trigger button 27 is partially protruded from the opening portion 31, and the lower end of the trigger guide 35 is fitted to the ribs 59, 62, and 63.

Figure 14:
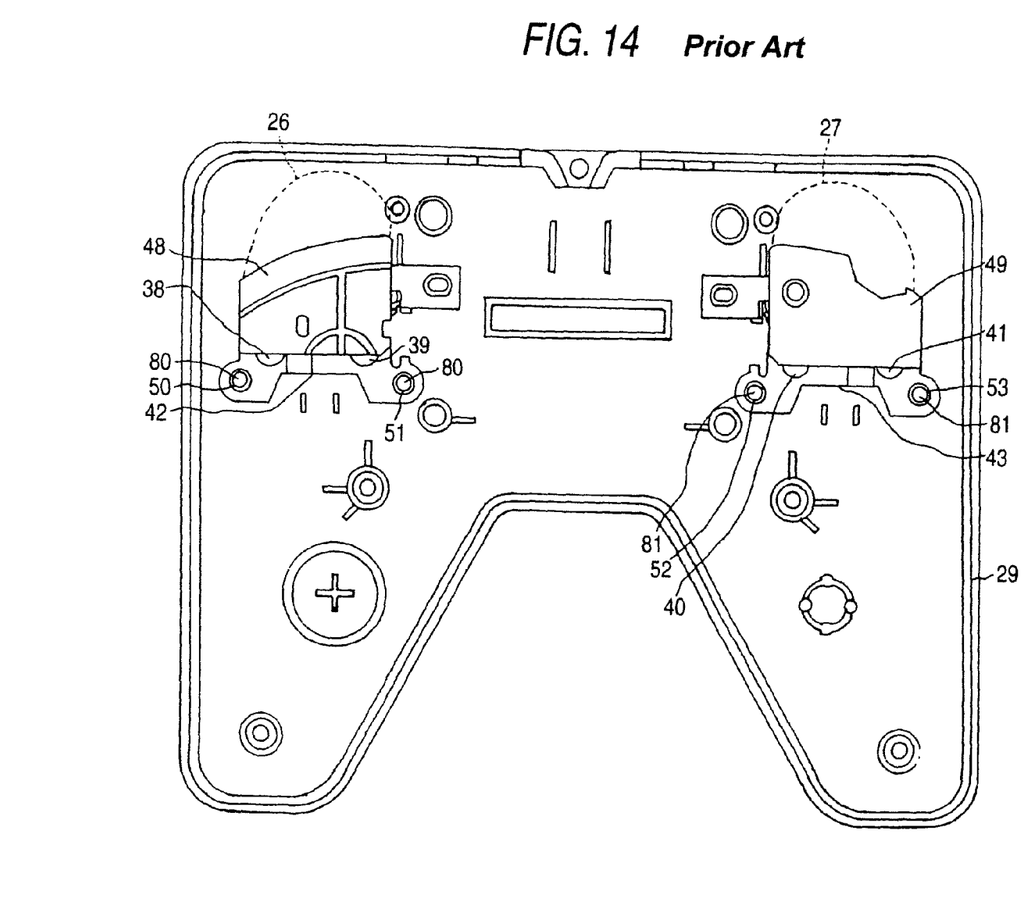
FIG. 14 is a perspective view showing another conventional example, which shows a state where a trigger button has been attached to a lower case.

Further, the cover 49 is put on the trigger button 27 and the trigger guide 35 as shown in FIG. 14; the fitting portions 40, 41 of the trigger guide 35 are inserted into the through-holes 56, 57 of the cover 49; the bolt insertion holes 52, 53 of the cover 49 are positioned at the upper ends of the standing portions 65, 65; and the cover 49 is secured by the bolts 81, 81. Accordingly, the cover 49 positions and fixes the trigger guide 35, whereby it can suppress inclination of the trigger button.

Next, the upper case 68 in which the baseboard 69 shown in FIG. 13 is arranged is engaged with the lower case 29. Under a state where the upper case 68 is engaged with the lower case 29, the cover 49 holds the baseboard 69, and can prevent deformation of the baseboard 69 when the baseboard 69 is pressed with various buttons.

Accordingly, when the trigger button 27 is pressed, the slide portion 33 of the trigger button 27 is guided by the guide portion 37 of the trigger guide 35, attitude-controlled by the shaft 47, and moved backward against the energizing force of the spring 45. Then, the leading end of the slide portion 33 of the trigger button 27 passes through the through-hole formed in the central portion of the trigger guide 35 and presses the trigger rubber 43 thereby to cause output in the trigger rubber 43. Simultaneously, the operational portion 27a of the trigger button 27 operates the slide switch 73 and another output is generated.

Further, similarly to the trigger button 27, the trigger button 26 can be assembled, and the similar operation can be performed after assembly.

However, regarding the trigger buttons 26, 27, the number of assembly parts is large, which causes increase of the material cost and bad assembly efficiency.

SUMARY OF THE INVENTION

Therefore, a technical problem to be solved is produced in the controller for games in order to reduce the number of parts in assembly of the trigger button, reduce the material cost, and increase the assembly efficiency. An object of the invention is to solve this problem.

The invention has been proposed in order to achieve the above object. According to the invention, in a controller for games in which a trigger button is partially protruded outward from an opening portion formed in a case, and the trigger button is energized by a spring and provided slidably by guide of a trigger guide, the controller for games is characterized in that: left and right fitting grooves extending up and down are provided on left and right sides of a back end surface of the trigger guide; a rib for holding a lower end portion of the trigger guide is provided for the case; left and right standing portions are provided on the outside of the rib; and the lower end of the trigger guide is held by the rib, and the left and right standing portions are fitted into the left and right fitting grooves, whereby the trigger guide is held.

Further, in a controller for games in which a trigger button is partially protruded outward from an opening portion formed in a case, and the trigger button is energized by a spring and provided slidably by guide of a trigger guide, the controller for games is characterized in that: left and right fitting grooves extending up and down are provided on left and right sides of a back end surface of the trigger guide; a rib for holding a lower end portion of the trigger guide is provided for the case; left and right standing portions are provided on the outside of the rib; a holder formed integrally with a motor holder is secured to a lower surface of a baseboard interposed in the case, and the holder is extended to the upside of the trigger guide thereby to provide an extension part; and the lower end of the trigger guide is held by the rib, the left and right standing portions are fitted into the left and right fitting grooves, and the upper end of the trigger guide is held by the extension part of the holder.

Further, the controller for games is constituted so that partition plates for partitioning the fitting groove up and down are formed in the left and right fitting grooves of the trigger guide, and the partition plates come into contact with the upper ends of the left and right standing portions thereby to position the trigger guide up and down.

DESCRIPTION OF THE PREFFERRED EMBODIMENT

Figure 1:
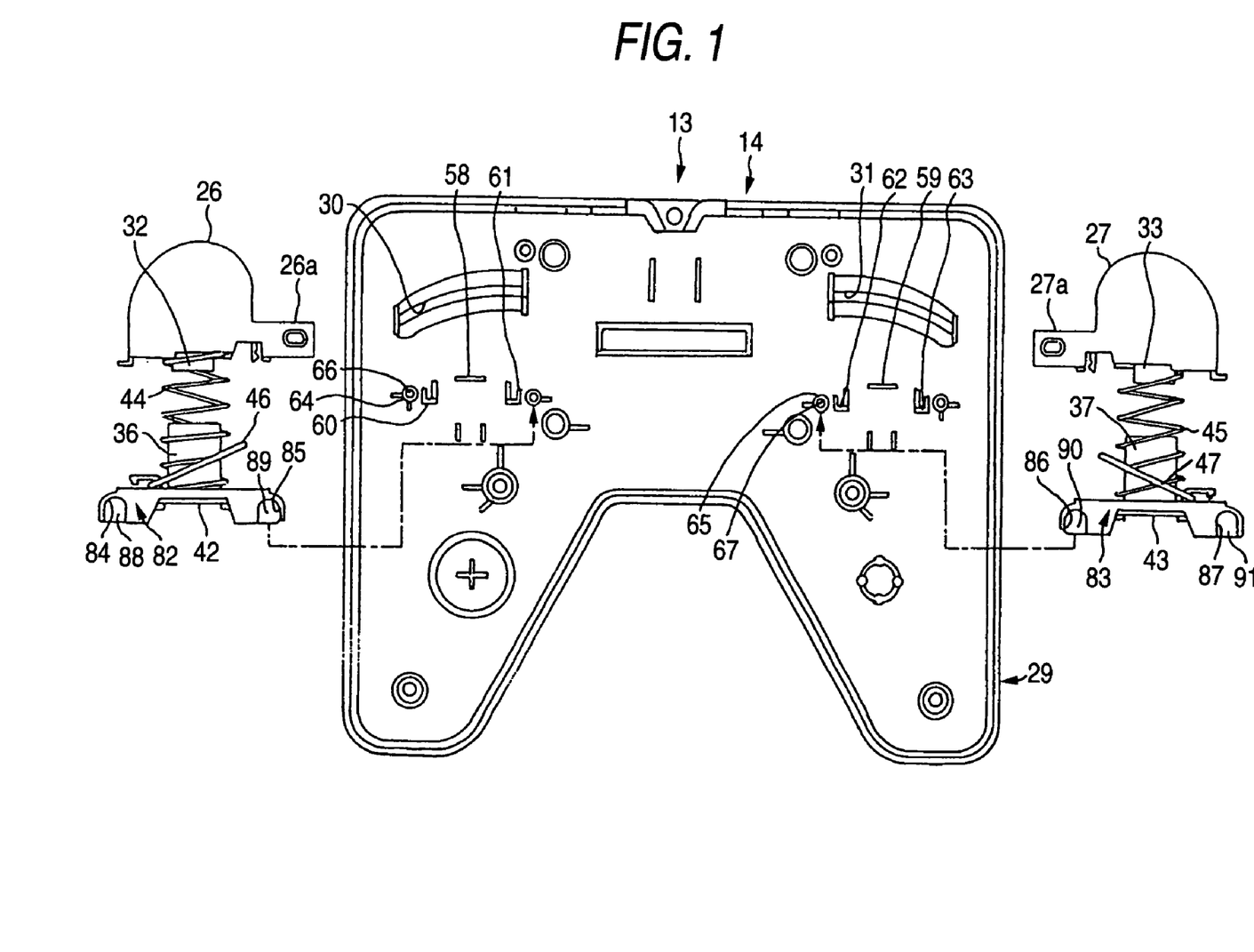
FIG. 1 is an exploded perspective view showing one embodiment of the invention, which shows a state where a trigger button is to be attached to a lower case.
Figure 2:
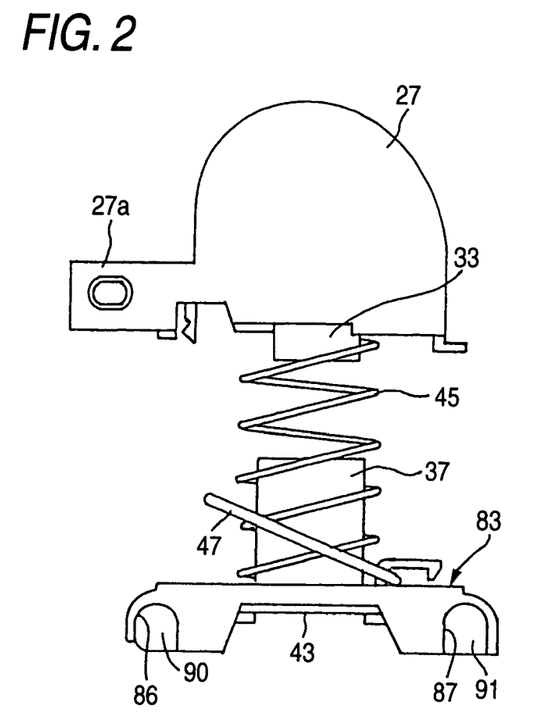
FIG. 2 is a plan view showing a state before assembly of the trigger button in FIG. 1 and a trigger guide.
Figure 3:
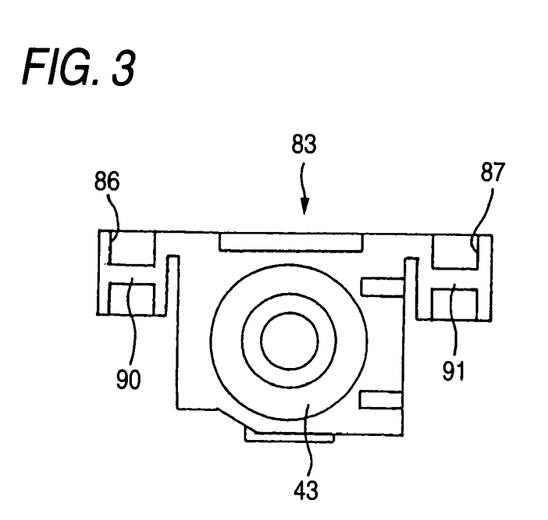
FIG. 3 is a front view of the trigger guide, showing one embodiment of the invention.

One embodiment of the invention will be described below in detail with reference to FIGS. 1 to 6. For convenience of explanation, the same component parts as those in the conventional example are denoted by the same reference numerals and their explanation is omitted. In FIGS. 1 to 3, reference numerals 82 and 83 are trigger guides used in place of the conventional trigger guides (reference numerals 34 and 35 in FIG. 8), and they have left and right fitting grooves 84, 85 and 86, 87 on left and right sides of back end surfaces of the trigger guides 82, 83. The left and right fitting grooves 84, 85 and 86, 87 extend up and down and have semi-circular sections, and partition plates 88, 89 and 90, 91 which partition the left and right fitting grooves 84, 85 and 86, 87 up and down.

Similarly to the conventional trigger guide, cylindrical guide portions 36, 37 which guide slide portions 32, 33 of trigger buttons 26, 27 are projectingly arranged on the front ends of the trigger guides 82, 83. Further, through-holes (not shown) are formed in the central portions of the trigger guides 82, 83, and trigger rubbers 42, 43 which are pressed by the leading ends of the slide portions 32, 33 of the trigger buttons 26, 27 thereby to operate are provided for the back ends of the trigger guides 82, 83.

In the invention, the cover (reference numerals 48, 49 in FIG. 8) used in the conventional example is not required, and bolts (reference numerals 80, 81 in FIG. 9) by which the cover is fixed are not also required.

Figure 4:
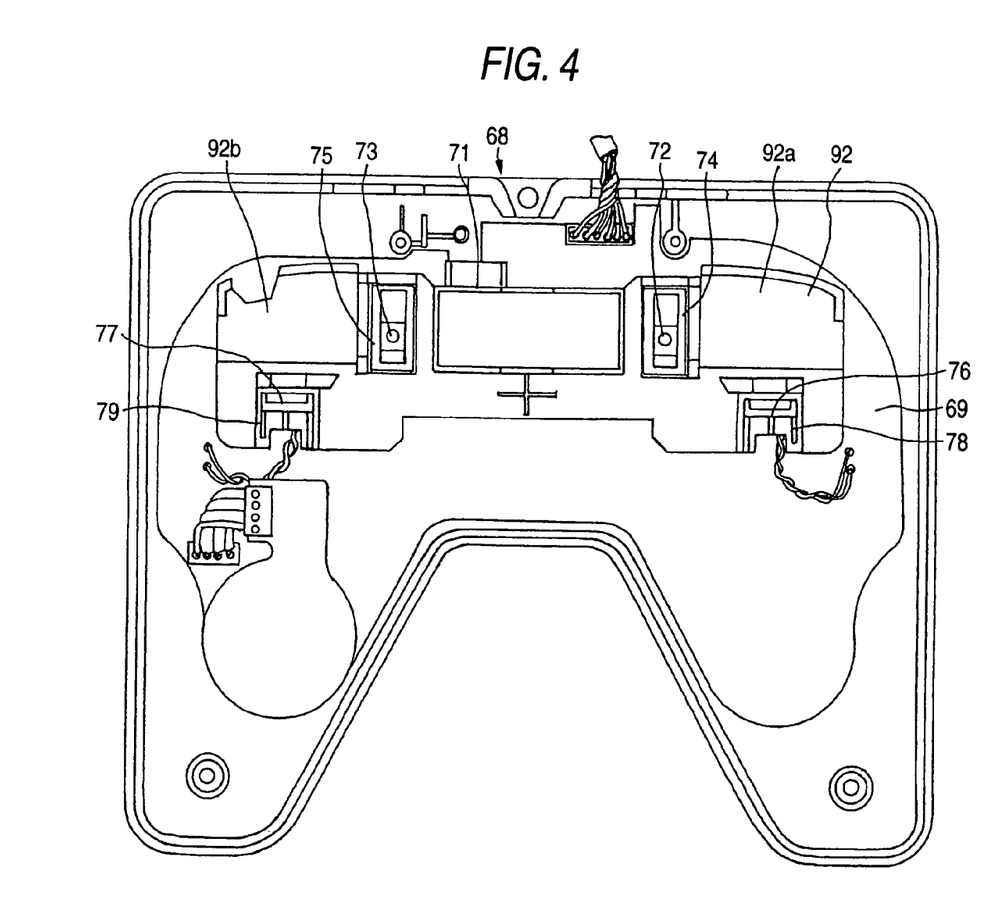
FIG. 4 is a perspective view of an upper case, a baseboard and a holder assembled into the upper case, showing one embodiment of the invention.

Further, in FIG. 4, reference numeral 92 is a holder used in place of the conventional holder (reference numeral 70 in FIG. 13). The holder 92 is extended to the portion corresponding to the conventional cover (reference numerals 48, 49 in FIG. 8), that is, to the upsides of the trigger guides 82, 83 thereby to provide extension parts 92a, 92b.

For example, when the trigger button 27 is assembled, the slide portion 33 of the trigger button 27 and the guide portion 37 of the trigger 83 are inserted into a spring 45, a shaft 47 is fitted to the left back end of the trigger button 27 and to the right front end of the trigger guide 83, and the slide portion 33 of the trigger button 27 is inserted into the guide portion 37 of the trigger guide 83 under a movably inserted state.

Figure 5:
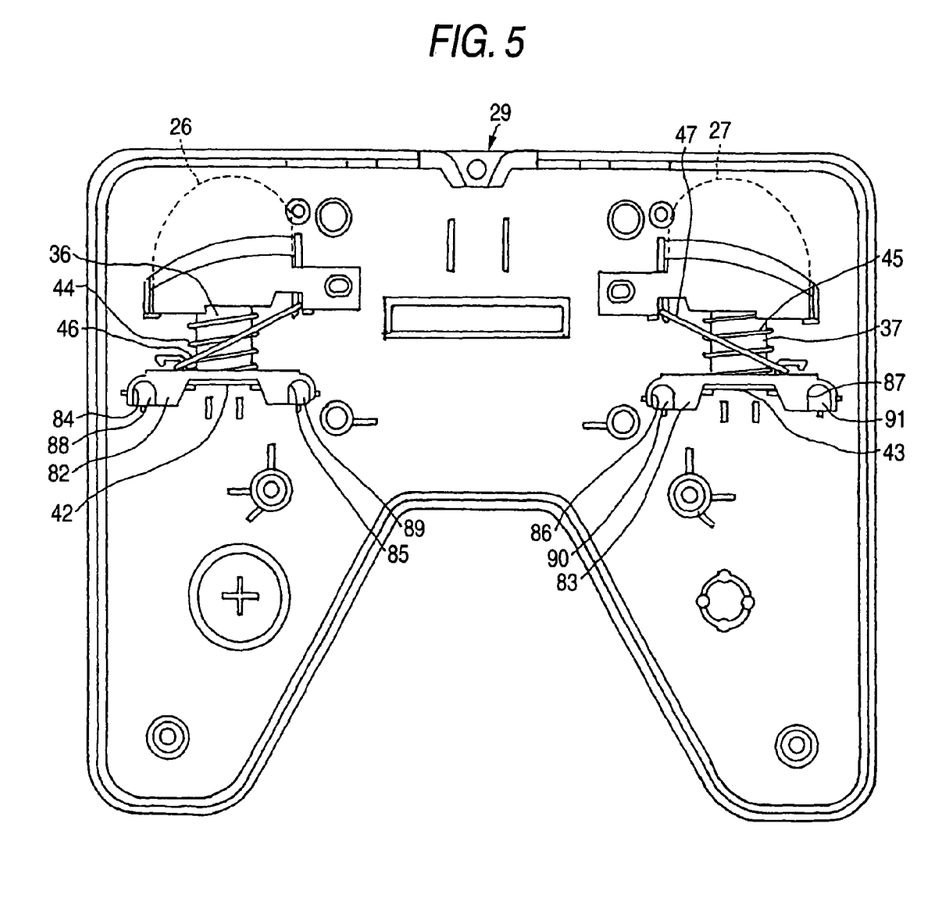
FIG. 5 is a perspective view showing one embodiment, which shows a state where the trigger button has been attached to the lower case.

Then, the front end of the trigger button 27 is partially protruded from an opening portion 31 formed in a lower case 29, the lower end of the trigger guide 83 is fitted to ribs 59, 62, 63, standing portions 65, 65 are fitted into the left and right fitting grooves 86, 87, and the partition plates 90, 91 formed in the fitting grooves 86, 87 are brought into contact with the upper ends of the standing portions 64, 65 to position the trigger button 27, whereby the trigger button 27 is assembled into the lower case 29 as shown in FIG. 5.

Next, when an upper case 68 shown in FIG. 4 in which a baseboard 69 is arranged is fitted to the lower case 29, the extension part 92b of the holder 92 secured to the lower end of the baseboard 69 holds the upper end of the trigger guide 83.

Accordingly, when the trigger button 27 is pressed, the slide portion 33 of the trigger button 27 is guided by the guide portion 37 of the trigger guide 83 and moved backward against the energizing force of the spring 45 in a state where it is attitude-controlled by the shaft 47. Then, the leading end of the slide portion 33 of the trigger button 27 passes through the through-hole formed in the central portion of the trigger guide 83 and presses the trigger rubber 43 thereby to cause the predetermined output in the trigger rubber 43. Simultaneously, an operational portion 27a of the trigger button 27 operates a slide switch 73 and another output is generated.

Further, similarly to the trigger button 27, the trigger button 26 can be assembled, and the similar operation can be performed after assembly.

Thus, in the invention, the lower ends of the trigger guides 82, 83 are held by the ribs 58, 60, 61, and 59, 62, 63; the left and right fitting grooves 84, 85 and 86, 87 of the trigger guides 82, 83 are fitted to the standing portions 64, 64 and 66, 67 and held by them; and the partition plates 88, 89 and 90, 91 are brought into contact with the upper ends of the standing portions 64, 65 and 66, 67 and positioned. Therefore, the trigger buttons are surely held in the predetermined positions, and even if the lower case 29 is turned upside down, each of the parts does not fall.

Further, since the conventional cover and bolt for fixing the cover are not required in the invention, the number of parts in assembly of the trigger button can be reduced, the material cost can be reduced, and assembly efficiency can be increased.

Further, since the holder 92 is provided with the extension parts 92a, 92b extending to the trigger guides 82, 83, the extension parts 92a, 92b can hold the trigger guides 82, 83; and when the baseboard 69 is pressed by various buttons, the deformation of the baseboard 69 can be prevented.

It is to be understood that various modifications may be made in the invention without departing from the spirit of the invention, and it is natural that the invention covers such the modifications.

As described in the above embodiment, according to the first aspect of the invention, in the controller for games, the left and right fitting grooves extending up and down are provided on the left and right sides of the back end surface of the trigger guide; the rib for holding the lower end portion of the trigger guide is provided for the case; and the left and right standing portions are provided on the outside of the rib. Therefore, the lower end of the trigger guide is held by the rib and the left and right standing portions are fitted into the left and right fitting grooves, whereby the trigger guide can be securely held. Therefore, even if the lower case is turned upside down under this state, each of the parts does not fall. Further, since the conventional cover and bolt for fixing the cover are not required, the number of parts in assembly of the trigger button can be reduced, the material cost can be reduced, and the assembly efficiency can be increased.

Further, according to the second aspect of the invention, in the controller for games, the left and right fitting grooves extending up and down are provided on the left and right sides of the back end surface of the trigger guide; the rib for holding the lower end portion of the trigger guide is provided for the case; the left and right standing portions are provided on the outside of the rib; and the holder formed integrally with the motor holder is secured to the lower surface of the baseboard interposed in the case, and the holder is extended to the upside of the trigger guide thereby to provide the extension part. Therefore, the lower end of the trigger guide is held by the rib, the left and right standing portions are fitted into the left and right fitting grooves, and the upper end of the trigger guide can be held by the extension part of the holder. Accordingly, in addition to the advantage in the first aspect of the invention, the trigger guide can be held by the extension part, and when the baseboard is pressed by the various buttons, the deformation of the baseboard can be prevented by the extension part.

Further, according to the third aspect of the invention, the partition plates for partitioning the fitting groove up and down are formed in the left and right fitting grooves of the trigger guide, and the partition plates come into contact with the upper ends of the left and right standing portions thereby to position the trigger guide up and down. Therefore, in addition to the advantage in the first or second aspect of the invention, such the large advantage is obtained that the trigger guide is surely held in the predetermined position in the up and down direction.

What is claimed is:

1. A game controller, comprising:
   a case having an opening;
   a trigger button partially protruding from said opening;
   a trigger guide for said trigger button and having fitting grooves provided on left and right sides of a back end surface of the trigger guide;
   partition plates formed in the left and right fitting grooves of the trigger guide partitioning the fitting grooves;
   ribs formed in the case for holding a lower end portion of the trigger guide; and
   standing portions formed in the case outside the ribs, the standing portions being fitted into said fitting grooves, the partition plates contacting upper ends of the left and right standing portions thereby securely positioning and holding the trigger guide.

2. The game controller according to claim 1, further comprising:
   a baseboard interposed in the case;
   a motor holder secured to the baseboard; and
   a holder formed integrally with the motor holder and secured to a lower surface of the baseboard, the holder being extended to an upside of the trigger guide thereby to provide an extension part, whereby the upside of the trigger guide is held by the extension part of the holder.

* * * * *